United States Patent
Keskitalo et al.

(10) Patent No.: US 9,693,265 B2
(45) Date of Patent: Jun. 27, 2017

(54) METHOD AND APPARATUS FOR MOBILE TERMINAL MOBILITY

(71) Applicant: Nokia Technologies Oy, Espoo (FI)

(72) Inventors: Ilkka Keskitalo, Oulu (FI); Elena Virtej, Espoo (FI); Jani Puttonen, Palokka (FI)

(73) Assignee: Nokia Technologies Oy, Espoo (FI)

( * ) Notice: Subject to any disclaimer, the term of this patent is extended or adjusted under 35 U.S.C. 154(b) by 101 days.

(21) Appl. No.: 14/371,358

(22) PCT Filed: Jan. 15, 2013

(86) PCT No.: PCT/FI2013/050037
§ 371 (c)(1),
(2) Date: Jul. 9, 2014

(87) PCT Pub. No.: WO2013/110851
PCT Pub. Date: Aug. 1, 2013

(65) Prior Publication Data
US 2015/0237533 A1    Aug. 20, 2015

Related U.S. Application Data

(60) Provisional application No. 61/590,947, filed on Jan. 26, 2012.

(51) Int. Cl.
*H04W 36/00* (2009.01)
*H04W 72/04* (2009.01)
*H04W 76/06* (2009.01)

(52) U.S. Cl.
CPC .... *H04W 36/0011* (2013.01); *H04W 72/0413* (2013.01); *H04W 76/06* (2013.01)

(58) Field of Classification Search
CPC ............. H04W 36/0011; H04W 76/06; H04W 72/0413

(Continued)

(56) References Cited

U.S. PATENT DOCUMENTS

2002/0172178 A1* 11/2002 Suzuki ................ H04W 76/068
                                                                  370/338
2004/0248577 A1* 12/2004 Sayeedi .............. H04W 76/041
                                                                  455/445

(Continued)

FOREIGN PATENT DOCUMENTS

EP      2120479      11/2009
WO      03061221     7/2003

(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol Specification (Release 10)", 3GPP TS 36.331, V10.4.0, Dec. 2011, pp. 1-296.

(Continued)

*Primary Examiner* — Maharishi Khirodhar
*Assistant Examiner* — Kenneth P Hunt
(74) *Attorney, Agent, or Firm* — Alston & Bird LLP (57) ABSTRACT

A method, apparatus and computer program product are provided herein to enable a current release timer value to be transferred to a target access point (e.g. target cell) in an instance in which a mobile terminal is performing a handover or has recently attached to a target access point. In some example embodiments, a method is provided that comprises determining that a handover condition exists for a mobile terminal. The method of this embodiment may also include determining a release timer value for the mobile terminal. The method of this embodiment may also include causing the release timer value to be transmitted to a target access point. In some example embodiments, the release timer value is configured to trigger a release timer in the target access point.

17 Claims, 6 Drawing Sheets

(58) Field of Classification Search
USPC .......................................................... 370/331
See application file for complete search history.

(56) References Cited

U.S. PATENT DOCUMENTS

| | | | | |
|---|---|---|---|---|
| 2008/0160999 | A1* | 7/2008 | Eklund | H04W 36/0083 |
| | | | | 455/436 |
| 2009/0268689 | A1* | 10/2009 | Fu | H04W 36/0055 |
| | | | | 370/331 |
| 2012/0329458 | A1* | 12/2012 | Hjelmgren | H04W 72/0433 |
| | | | | 455/436 |

FOREIGN PATENT DOCUMENTS

| | | |
|---|---|---|
| WO | 2006018670 | 2/2006 |
| WO | 2008095935 | 8/2008 |
| WO | 2013050648 | 4/2013 |

OTHER PUBLICATIONS

International Search Report and Written Opinion eceived for corresponding Patent Cooperation Treaty Application No. PCT/FI2013/050037 r dated Jun. 2, 2011, 16 pages.
Office Action and Search Report for Chinese Patent Application No. 201380006706.2 dated Apr. 19, 2017, with English translation, 24 pages.

\* cited by examiner

METHOD AND APPARATUS FOR MOBILE TERMINAL MOBILITY

RELATED APPLICATION

This application was originally filed as PCT Application No. PCT/FI2013/050037 filed Jan. 15, 2013 which claims priority benefit from U.S. Application No. 61/590,947, filed Jan. 26, 2012.

TECHNOLOGICAL FIELD

Embodiments of the present invention relate generally to wireless communications technology and, more particularly, relate to a method, apparatus, and computer program product for optimized state control in mobile networks.

BACKGROUND

The evolving networks and new types of mobile terminals, particularly smart phones, are gradually changing the characteristics of mobile traffic. There are more and more applications requiring always-on type of connections. Such a trend gives rise to a number of challenges both in the radio access network load as well as challenges relating to, for example battery drain, in mobile terminals. For example, the network may experience signaling load issues caused by a large number of connected mobile terminals or mobile terminals constantly changing state between idle and connected.

Mobile terminals, such as smart phones, generate traffic even while unattended by a user simply because certain applications are currently executing. For example, applications that include social networking (e.g. Facebook), instant messaging (Nimbuzz, Skype) or the like may generate status updates, polling, keep alive or similar traffic even when the applications are not actively being used. The traffic typically consists of small packets (or bursts of packets) sent intermittently. Also different operating systems (OS) may check various updates regularly.

Despite being "always-on" a mobile terminal's power consumption may be close to the idle mode power consumption when services are not actively used. For example, a mobile terminal may be configured with (long) discontinuous reception (DRX), or they may be in an idle state between the data bursts allowing sufficient "sleep" times for the mobile terminal.

In long term evolution (LTE) networks the state transitions, DRX configuration and the usage of Physical Uplink Control Channel (PUCCH) resources are controlled by the network. Thus, the LTE networks attempt to achieve the optimum operation both from the mobile terminal and network perspective.

BRIEF SUMMARY

A method, apparatus and computer program product are therefore provided according to an example embodiment to enable a current release timer value to be transferred to a target access point (e.g. target cell) in an instance in which a mobile terminal is performing a handover or has recently attached to a target access point. In some example embodiments described herein, the release timer period may be stored by a network and/or may be specific to a particular mobile terminal. The release timer period may also be transferred to the target access point such as by the current access point or other network entity. Further, the current release timer period may be optionally transferred to the mobile terminal or may be transferred directly to the target access point. In an instance in which the current release timer period is transferred to the mobile terminal, the mobile terminal may then provide the release timer period and inactive time since the last data transfer to the target access point during handover. As is described herein, by transferring the current release timer to a target cell, advantageously, mobile terminal power consumption and network signaling load may also be reduced.

In some example embodiments, a method is provided that comprises determining that a handover condition exists for a mobile terminal. The method of this embodiment may also include determining a release timer value for the mobile terminal. The method of this embodiment may also include causing the release timer value to be transmitted to a target access point. In some example embodiments, the release timer value is configured to trigger a release timer in the target access point.

In further example embodiments, an apparatus is provided that includes at least one processor and at least one memory including computer program code with the at least one memory and the computer program code being configured, with the at least one processor, to cause the apparatus to at least determine that a handover condition exists for a mobile terminal. The at least one memory and computer program code may also be configured to, with the at least one processor, cause the apparatus to determine a release timer value for the mobile terminal. The at least one memory and computer program code may also be configured to, with the at least one processor, cause the apparatus to cause the release timer value to be transmitted to a target access point. In some example embodiments, the release timer value is configured to trigger a release timer in the target access point.

In yet further example embodiments, a computer program product may be provided that includes at least one non-transitory computer-readable storage medium having computer-readable program instructions stored therein with the computer-readable program instructions including program instructions configured to determine that a handover condition exists for a mobile terminal. The computer-readable program instructions may also include program instructions configured to determine a release timer value for the mobile terminal. The computer-readable program instructions may also include program instructions configured to cause the release timer value to be transmitted to a target access point. In some example embodiments, the release timer value is configured to trigger a release timer in the target access point.

In yet further example embodiments, an apparatus is provided that includes means for determining that a handover condition exists for a mobile terminal. The apparatus of this embodiment may also include means for determining a release timer value for the mobile terminal. The apparatus of this embodiment may also include means for causing the release timer value to be transmitted to a target access point. In some example embodiments, the release timer value is configured to trigger a release timer in the target access point.

In some example embodiments, a method is provided that comprises determining that a handover condition exists. The method of this embodiment may also include receiving a release timer value in an instance in which the handover condition is determined to exist. The method of this embodiment may also include causing the release timer value to be transmitted to a target access point. In some example embodiments, the target access point is configured to use the release timer value to trigger a release timer.

In further example embodiments, an apparatus is provided that includes at least one processor and at least one memory including computer program code with the at least one memory and the computer program code being configured, with the at least one processor, to cause the apparatus to at least determine that a handover condition exists. The at least one memory and computer program code may also be configured to, with the at least one processor, cause the apparatus to receive a release timer value in an instance in which the handover condition is determined to exist. The at least one memory and computer program code may also be configured to, with the at least one processor, cause the apparatus to cause the release timer value to be transmitted to a target access point. In some example embodiments, the target access point is configured to use the release timer value to trigger a release timer.

In yet further example embodiments, a computer program product may be provided that includes at least one non-transitory computer-readable storage medium having computer-readable program instructions stored therein with the computer-readable program instructions including program instructions configured to determine that a handover condition exists. The computer-readable program instructions may also include program instructions configured to receive a release timer value in an instance in which the handover condition is determined to exist. The computer-readable program instructions may also include program instructions configured to cause the release timer value to be transmitted to a target access point. In some example embodiments, the target access point is configured to use the release timer value to trigger a release timer.

In yet further example embodiments, an apparatus is provided that includes means for determining that a handover condition exists. The apparatus of this embodiment may also include means for receiving a release timer value in an instance in which the handover condition is determined to exist. The apparatus of this embodiment may also include means for causing the release timer value to be transmitted to a target access point. In some example embodiments, the target access point is configured to use the release timer value to trigger a release timer.

In some example embodiments, a method is provided that comprises receiving a release timer value in an instance in which a handover condition is determined to exist for a mobile terminal. The method of this embodiment may also include receiving a release timer period. The method of this embodiment may also include determining a current release timer value based on the release timer value and the release timer value. The method of this embodiment may also include causing a release timer to be activated.

In further example embodiments, an apparatus is provided that includes at least one processor and at least one memory including computer program code with the at least one memory and the computer program code being configured, with the at least one processor, to cause the apparatus to at least receive a release timer value in an instance in which a handover condition is determined to exist for a mobile terminal. The at least one memory and computer program code may also be configured to, with the at least one processor, cause the apparatus to receive a release timer period. The at least one memory and computer program code may also be configured to, with the at least one processor, cause the apparatus to determine a current release timer value based on the release timer value and the release timer value. The at least one memory and computer program code may also be configured to, with the at least one processor, cause the apparatus to cause a release timer to be activated.

In yet further example embodiments, a computer program product may be provided that includes at least one non-transitory computer-readable storage medium having computer-readable program instructions stored therein with the computer-readable program instructions including program instructions configured to receive a release timer value in an instance in which a handover condition is determined to exist for a mobile terminal. The computer-readable program instructions may also include program instructions configured to receive a release timer period. The computer-readable program instructions may also include program instructions configured to determine a current release timer value based on the release timer value and the release timer value. The computer-readable program instructions may also include program instructions configured to cause a release timer to be activated.

In yet further example embodiments, an apparatus is provided that includes means for receiving a release timer value in an instance in which a handover condition is determined to exist for a mobile terminal. The apparatus of this embodiment may also include means for receiving a release timer period. The apparatus of this embodiment may also include means for determining a current release timer value based on the release timer value and the release timer value. The apparatus of this embodiment may also include means for causing a release timer to be activated.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION

Some example embodiments will now be described more fully hereinafter with reference to the accompanying drawings, in which some, but not all embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term "circuitry" refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in a server, a cellular network device, or other network device.

In LTE networks the mobile terminal connection state is controlled by the network. In some example embodiments, a release timer is used to determine when the connection should be released. The release timer is normally started at the last data transfer and the data buffers are empty (e.g. buffer status report in indicating no downlink (DL) data in the queue). When the timer expires the network may initiate a radio resource control (RRC) connection release for that particular mobile terminal. In some example embodiments, the timer may expire because a data transfer does not occur while the timer is running. In the following text, the term "release timer value" refers to the timer value when it is running whereas the term "release timer period" refers to the time it takes from the timer start until it expires. The release timer value indicates inactivity time since the last data transfer or empty data buffer indication.

The release timer as well as the usage is set based on network implementation. The release timer may use a "global" value for the period throughout the network for all mobile terminals. The timer period may also be cell specific and may take into account the (average) radio conditions as well as approximated mobile terminal velocities that can be expected within the cell.

However, the optimized setting of the release timer period is not only a function of cell type and/or terminal speed but also a function of the characteristics of the data traffic that the running applications are generating. A mobile terminal specific release timer period may also be generated that includes parameters, such as, but not limit to: cell specific issues, terminal velocity, DRX configuration as well as the traffic characteristics.

Even though the release timer setting may be optimized in LTE networks, mobile terminal mobility may cause additional difficulties in determining the desired level of state control for moving mobile terminals. For example, with intermittent traffic and/or with longer inter-burst intervals, the release timer will continue to run. Currently, in an instance in which the mobile terminal initiates a handover procedure with the release timer still running, the target cell may then restart the release timer from the beginning (if still no further data). Consequently, the effective release time in worst case may be doubled, which results in less than optimal behavior in the network. The target cell may not be aware of the release timer period that has been used in the source cell. This is the case especially if the release timer is adjusted on for a particular mobile terminal according to parameters related to the particular mobile terminal. All such information will not be known by the target cell when the handover fails or when there is a radio link failure (RLF).

A method, apparatus and computer program product are therefore provided to optimize network behavior according to an example embodiment to enable a current release timer value and period to be transferred to a target access point (e.g. target cell) in an instance in which a mobile terminal is performing a handover or has recently attached to a target access point. The current release timer value and the release timer period may be transferred to the target access point, such as by the access point, the mobile terminal or the like.

Figure 1:
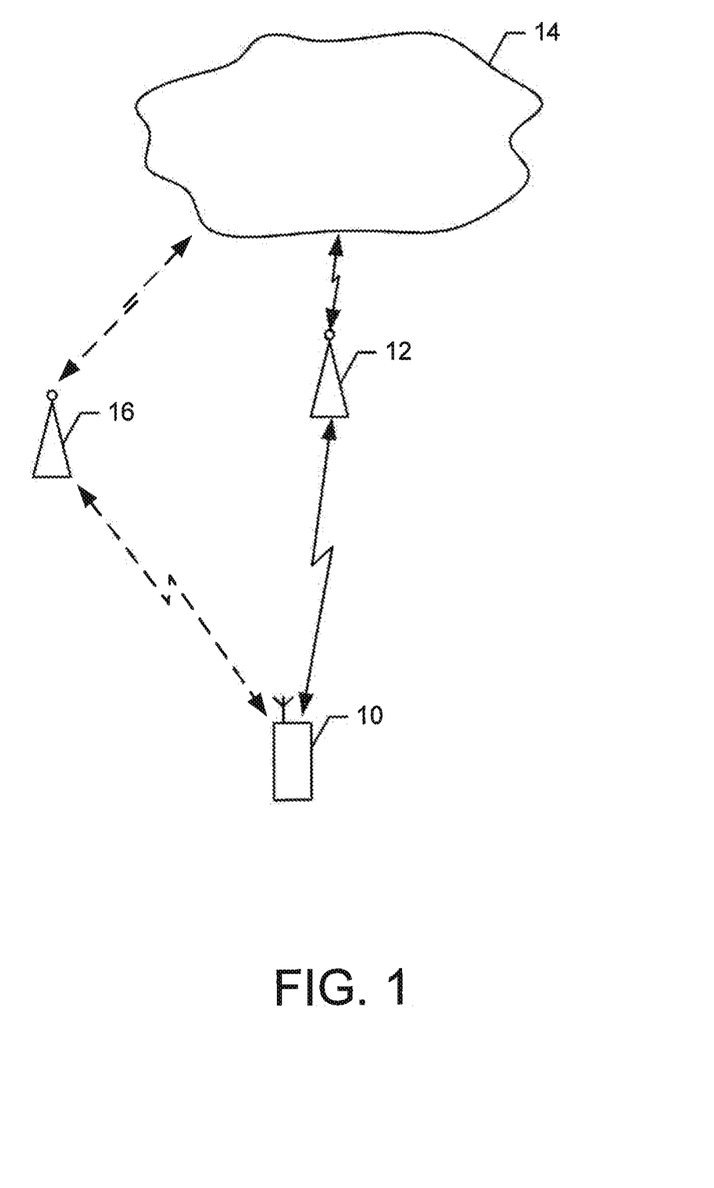
FIG. 1 is a schematic representation of an example system having a mobile terminal that may be configured to perform optimized state control.

Although the method, apparatus and computer program product may be implemented in a variety of different systems, one example of such a system is shown in FIG. 1, which includes a first communication device (e.g., mobile terminal 10) that is capable of communication via an access point 12 and/or target access point 16. Access point 12 and/or target access point 16 may take the form a base station, a CSG cell, a home Node B, a Node B, an evolved Node B (eNB) or other access point, with a network 14 (e.g., a core network). As is shown in FIG. 1, the mobile terminal 10 may currently be attached to access point 12, but in some example embodiments may perform handover to target access point 16. While the network may be configured in accordance with LTE or LTE-Advanced (LTE-A), other networks may support the method, apparatus and computer program product of some embodiments of the present invention including those configured in accordance with wideband code division multiple access (W-CDMA), CDMA2000, global system for mobile communications (GSM), general packet radio service (GPRS) and/or the like.

The network 14 may include a collection of various different nodes, devices or functions that may be in communication with each other via corresponding wired and/or wireless interfaces. For example, the network may include one or more cells, including access point 12 and/or target access point 16 which may serve a respective coverage area. The access point 12 and/or target access point 16 could be, for example, part of one or more cellular or mobile networks or PLMNs. In turn, other devices such as processing devices (e.g., personal computers, server computers or the like may be coupled to the mobile terminal 10 and/or other communication devices via the network.

A communication device, such as the mobile terminal 10 (also known as user equipment (UE)), may be in communication with other communication devices or other devices via the access point 12 and/or target access point 16 and, in turn, the network 14. In some cases, the communication device may include an antenna for transmitting signals to and for receiving signals from an access point.

When referred to herein, serving cell includes, but is not limited to a primary serving cell (PCell) and other serving cells such as secondary serving cells (SCell) that may be operating on an access point, such as access point 12 and/or target access point 16. A candidate cell, target cell, neighbor cell and/or the like may also be used herein, and that includes a cell that is not currently a serving cell, but may become a serving cell in the future. A PCell, which may be embodied by an access point, generally includes, but is not limited to, a cell that is configured to perform initial establishment procedures, security procedures, system information (SI) acquisition and change monitoring procedures on the broadcast channel (BCCH) or data channel (PDCCH) and paging. The SCell, which may be embodied by a remote radio head (RRH) and is configured to provide additional radio resources to the PCell.

In some example embodiments, the mobile terminal 10 may be a mobile communication device such as, for example, a mobile telephone, portable digital assistant (PDA), pager, laptop computer, or any of numerous other hand held or portable communication devices, computation devices, content generation devices, content consumption devices, or combinations thereof. As such, the mobile terminal 10 may include one or more processors that may define processing circuitry either alone or in combination with one or more memories. The processing circuitry may utilize instructions stored in the memory to cause the mobile terminal 10 to operate in a particular way or execute specific functionality when the instructions are executed by the one or more processors. The mobile terminal 10 may also include communication circuitry and corresponding hardware/software to enable communication with other devices and/or the network 14.

Figure 2:
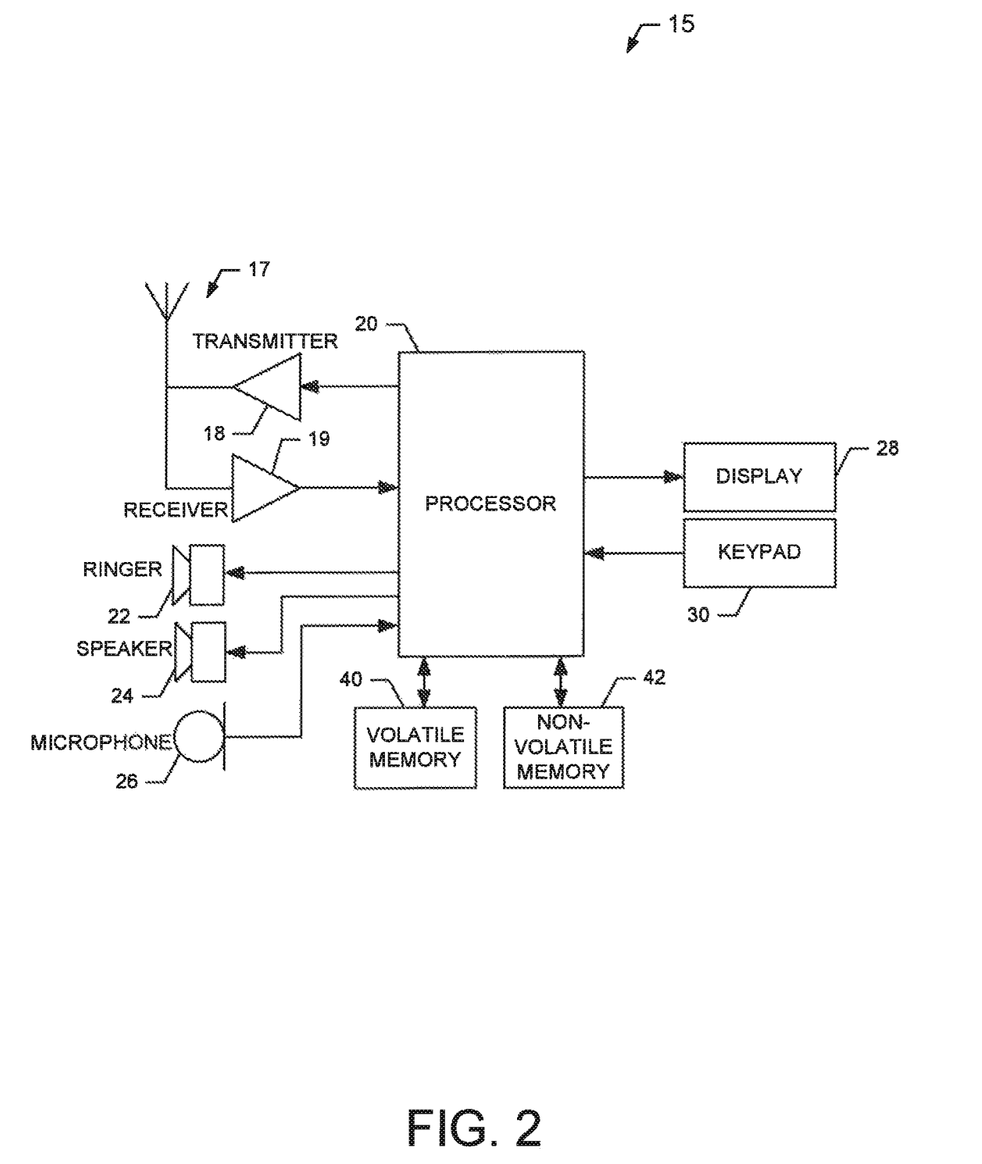
FIG. 2 is a block diagram of an example apparatus that may be embodied by a mobile terminal in accordance with some example embodiments of the present invention.

In one embodiment, for example, the mobile terminal 10 may be embodied as or otherwise include an apparatus 15 as generically represented by the block diagram of FIG. 2. While the apparatus 15 may be employed, for example, by a mobile terminal 10, it should be noted that the components, devices or elements described below may not be mandatory and thus some may be omitted in certain embodiments. Additionally, some embodiments may include further or different components, devices or elements beyond those shown and described herein.

In this regard, FIG. 2 illustrates an example block diagram of an apparatus 15. While several embodiments of a mobile terminal or access point (e.g., apparatus 15) are illustrated and will be hereinafter described for purposes of example, other types of user terminals, such as mobile telephones, mobile computers, portable digital assistants (PDAs), pagers, laptop computers, desktop computers, gaming devices, televisions, and other types of electronic systems, may employ some embodiments of the present invention.

As shown, the apparatus 15 may include an antenna 17 (or multiple antennas 17) in communication with a transmitter 18 and a receiver 19. The apparatus 15 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the apparatus 15 may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from some embodiments of this invention, as should dual or higher mode phones (e.g., digital/analog or TDMA/CDMA/analog phones). Additionally, the apparatus 15 may be capable of operating according to Wireless Fidelity (Wi-Fi) or Worldwide Interoperability for Microwave Access (WiMAX) protocols.

It is understood that the processor 20 may comprise circuitry for implementing audio/video and logic functions of the apparatus 15. For example, the processor 20 may comprise a digital signal processor device, a microprocessor device, an analog-to-digital converter, a digital-to-analog converter, and/or the like. Control and signal processing functions of the apparatus 15 may be allocated between these devices according to their respective capabilities. Further, the processor may comprise functionality to operate one or more software programs, which may be stored in memory. For example, the processor 20 may be capable of operating a connectivity program, such as a web browser. The connectivity program may allow the apparatus 15 to transmit and receive web content, such as location-based content, according to a protocol, such as Wireless Application Protocol (WAP), hypertext transfer protocol (HTTP), and/or the like. The apparatus 15 may be capable of using a Transmission Control Protocol/Internet Protocol (TCP/IP) to transmit and receive web content across the internet or other networks.

The apparatus 15 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In some embodiments including a keypad, the keypad may comprise numeric (0-9) and related keys (#, *), and/or other keys for operating the mobile terminal.

The apparatus 15 may comprise memory, such as a smart cart, subscriber identity module or subscriber identification module (SIM), a removable user identity module (R-UIM), and/or the like, which may store information elements related to a mobile subscriber. In addition to the SIM, the mobile terminal may comprise other removable and/or fixed memory. The apparatus 15 may include other non-transitory memory, such as at least one of a volatile memory 40 and/or at least one of a non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the apparatus 15.

Figure 3:
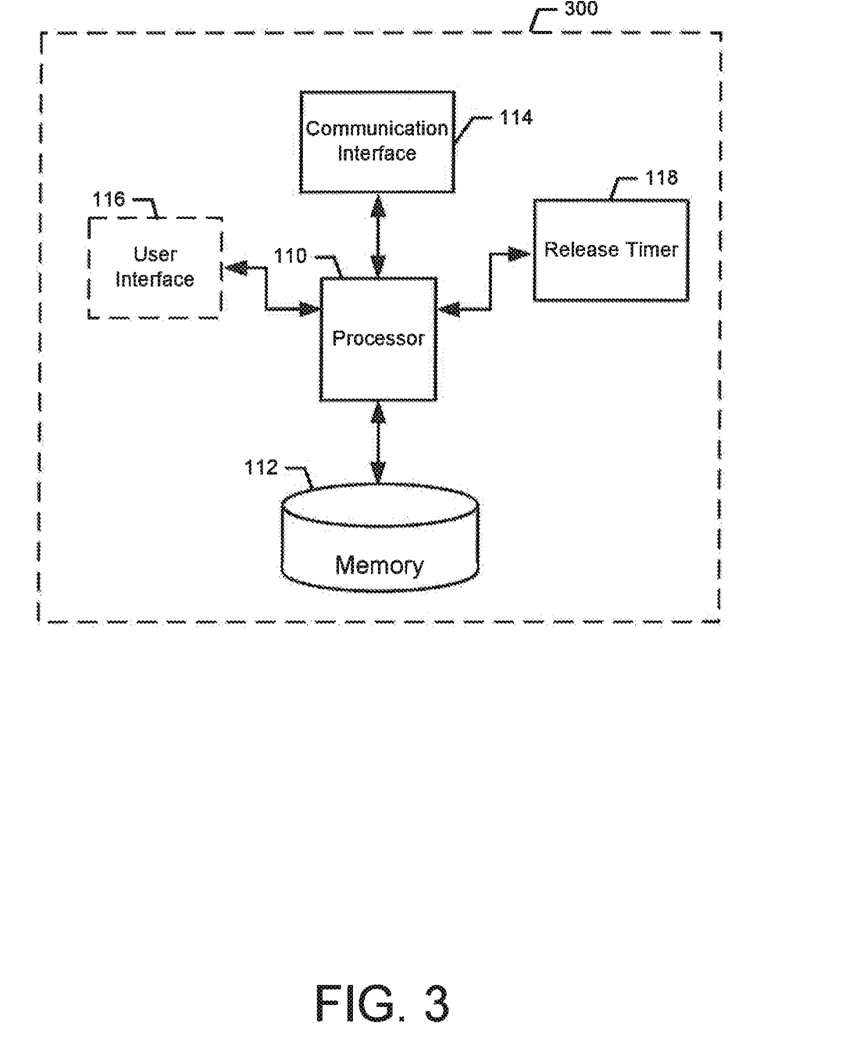
FIG. 3 illustrates a block diagram of an apparatus according to some example embodiments of the current invention.

Referring now to FIG. 3, FIG. 3 illustrates a block diagram of an apparatus 300 according to an example embodiment. In the example embodiment, the mobile terminal 10, the access point 12 and/or the target access point 16 may be implemented in or otherwise embodied by the apparatus 300. The apparatus 300 may comprise one or more of a processor 110, memory 112, communication interface 114, user interface 116, or release timer circuitry 118. The means of the apparatus 300 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (for example memory 112) that is executable by a suitably configured processing device (e.g., the processor 110), or some combination thereof.

In some example embodiments, one or more of the means illustrated in FIG. 3 may be embodied as a chip or chip set. In other words, the apparatus 300 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 110, memory 112, communication interface 114, user interface 116, and/or release timer circuitry 118 may be embodied as a chip or chip set. The apparatus 300 may therefore, in some example embodiments, be configured to implement embodiments of the present invention on a single chip or as a single "system on a chip." As another example, in some example embodiments, the apparatus 300 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 3 as a single processor, in some embodiments the processor 110 may comprise a plurality of processors. The plurality of processors may be in operative communication with each other and may be collectively configured to perform one or more functionalities of the apparatus 300 as described herein. The plurality of processors may be embodied on a single computing device or distributed across a plurality of computing devices collectively configured to function as the apparatus 300. In embodiments wherein the apparatus 300 is embodied as a mobile terminal 10, the processor 110 may be embodied as or comprise the processor 20. In some example embodiments, the processor 110 is configured to execute instructions stored in the memory 112 or otherwise accessible to the processor 110. These instructions, when executed by the processor 110, may cause the apparatus 300 to perform one or more of the functionalities of the apparatus 300 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise one or more tangible and/or non-transitory computer-readable storage media that may include volatile and/or non-volatile memory. Although illustrated in FIG. 3 as a single memory, the memory 112 may comprise a plurality of memories. The plurality of memories may be embodied on a single computing device or may be distributed across a plurality of computing devices collectively configured to function as the apparatus 300. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the apparatus 300 is embodied as a mobile terminal 10, the memory 112 may comprise the volatile memory 40 and/or the non-volatile memory 42. The memory 112 may be configured to store information, data, applications, instructions, or the like for enabling the apparatus 300 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. This stored information may be stored and/or used by the release timer circuitry 118 during the course of performing its functionalities.

The communication interface 114 may be embodied as any device or means embodied in circuitry, hardware, a computer program product comprising computer readable program instructions stored on a computer readable medium (for example, the memory 112) and executed by a processing device (for example, the processor 110), or a combination thereof that is configured to receive and/or transmit data from/to another computing device. In an example embodiment, the communication interface 114 may be at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the streaming client apparatus 102 and one or more computing devices or computing resources may be in communication. As an example, the communication interface 114 may be configured to enable communication between the apparatus 300 and another device, such as another apparatus 300. As a further example, the communication interface 114 may be configured to enable communication via the network 106. The communication interface 114 may additionally be in communication with the memory 112, user interface 116, and/or release timer circuitry 118, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In embodiments wherein the user interface 116 comprises a touch screen display, the user interface 116 may additionally be configured to detect and/or receive indication of a touch gesture or other input to the touch screen display. The user interface 116 may be in communication with the memory 112, communication interface 114, and/or release timer circuitry 118, such as via a bus.

The release timer circuitry 118 may be embodied as various means, such as circuitry, hardware, a computer program product comprising computer readable program instructions stored on a computer readable medium (for example, the memory 112) and executed by a processing device (for example, the processor 110), or some combination thereof and, in some embodiments, is embodied as or otherwise controlled by the processor 110. In embodiments wherein the release timer circuitry 118 is embodied separately from the processor 110, the release timer circuitry 118 may be in communication with the processor 110. The release timer circuitry 118 may further be in communication with one or more of the memory 112, communication interface 114, or user interface 116, such as via a bus.

Example access point 12, may be configured to cause, such as by the processor 110, the release timer circuitry 118, the communications interface 114 or the like, the release timer period as well as the currently running release timer value, such as the timer running on access point 12, to be transmitted and/or forwarded to a target access point 16. As is used herein, the release timer period is adjustable for a mobile terminal and/or for a particular cell. In some instances, the network, such as via access point 12, may set a single global release timer period for all mobile terminals. In such cases, the timer period would not need to be transmitted and only the running release timer value would be transmitted to the target access point 16. The target access point 16 may then use the release timer value to initialize, such as by the processor 110, the release timer circuitry 118 or the like, the release timer in the new cell.

In instances in which the release timer period is not designated global or cell specific, the target access point 16 may be configured to store, such as by the processor 110, the release timer circuitry 118, or the like, the release period as a mobile terminal specific parameter in the memory 112. Hence, the release timer will not be re-started from a default value, but instead would be started, restarted, set or the like by the target access point 16 based on the received release timer period.

In some example embodiments, the release timer value and/or period may be transmitted by the access point 12 in a handover (HO) message over, for example the X2 or S1, interfaces. The HO message may be transmitted via the X2 interface and may carry the release timer value and/or period; such a message may include the HANDOVER REQUEST message from the access point 12 to the target access point 16.

Alternatively or additionally, the mobile terminal 10 may receive, such as via the communications interface 114, a current release timer period and/or release timer value from the access point 12. The mobile terminal 10 may then be configured to cause, such as by the processor 110, the communications interface 114, the release timer circuitry 118, or the like, the current timer period and/or release timer value to be transmitted to the target access point 16 during the HO procedure. The mobile terminal 10 may also cause a time value indicating the time since the last data transfer to be transferred to the target access point 16 instead of the release timer value which may not be available at the mobile terminal 10. The time value indicating the time since the last data transfer may be used by the target access point 16 as the initial value for the release timer. Advantageously, for example, using the mobile terminal 10 to route the release timer value may cover a HO failure or RLF and an instance in which a connection is setup between the mobile terminal 10 and an un-prepared cell (e.g. a cell without the mobile terminal context). Such a situation would not enable the release timer value to be received from a previous access point, but it would allow the un-prepared cell to receive the release timer value from the mobile terminal 10.

In some example embodiments, the mobile terminal 10, such as by the processor 110, may determine whether a connection with an access point 12 is to be released. In an instance in which the release time is determined to be released, the mobile terminal 10 may cause a request to be transmitted to the access point 12 to release the connection. The mobile terminal 10, such as by the processor 110, may determine whether a connection is to be released based on traffic type and characteristics, other mobile terminal internal information, mobile terminal velocity, or other relevant parameters In some example embodiments, the mobile terminal 10 may be configured to include, such as by the processor 110, the release timer value and/or period in a RRCConnection-ReconfigurationComplete-message in an instance in which a successful HO is completed. In an instance in which a HO failure occurs, the release timer value and/or period may be included in a RRCConnectionReestablishmentComplete-message during a re-establishment procedure. In an instance in which the connection is lost during the HO and the mobile terminal 10 transitions to idle, the release timer value and/or period can be included in a RRCConnectionSetupComplete-message. Alternatively or additionally, other signaling during HO and other available messages may be considered for the transfer of the release timer value and/or period.

Alternatively or additionally, the release timer value and the release timer period may be also be jointly transmitted by access point 12 and mobile terminal 10 to the target access point 16 and the mobile terminal 10. For example, the mobile terminal 10 may be configured to send, to the target access point 16, the current timer value, or measured inactive time since last data transfer, during the HO procedure. The access point 12 may also cause the timer related values, either release timer value or period, or both, to be transmitted to the target access point 16. In alternate embodiments, the mobile terminal 10 may be configured to send the release period, if available at the mobile terminal 10, and the network would be configured to the current value of the running release timer.

In some example embodiments, an indication may be provided to the mobile terminal 10 that provides release timer configuration information (e.g. mobile terminal specific, cell specific or global values) for the network. For example, the indication may indicate how the release timers are currently set and/or used in the network. Based on the received indication, the mobile terminal 10 may determine, such as by the processor 110, whether it is necessary to send the timer release period to a target access point 16. For example in an instance in which a global value was used, the mobile terminal 10 would not be configured to provide the period to the target access point 16. The indication may be received by the mobile terminal 10, such as by the communications interface 114, via dedicated signaling (e.g. RRC-ConnectionReconfiguration-message) or via broadcasted information in a system information blocks (SIB).

Figure 4:
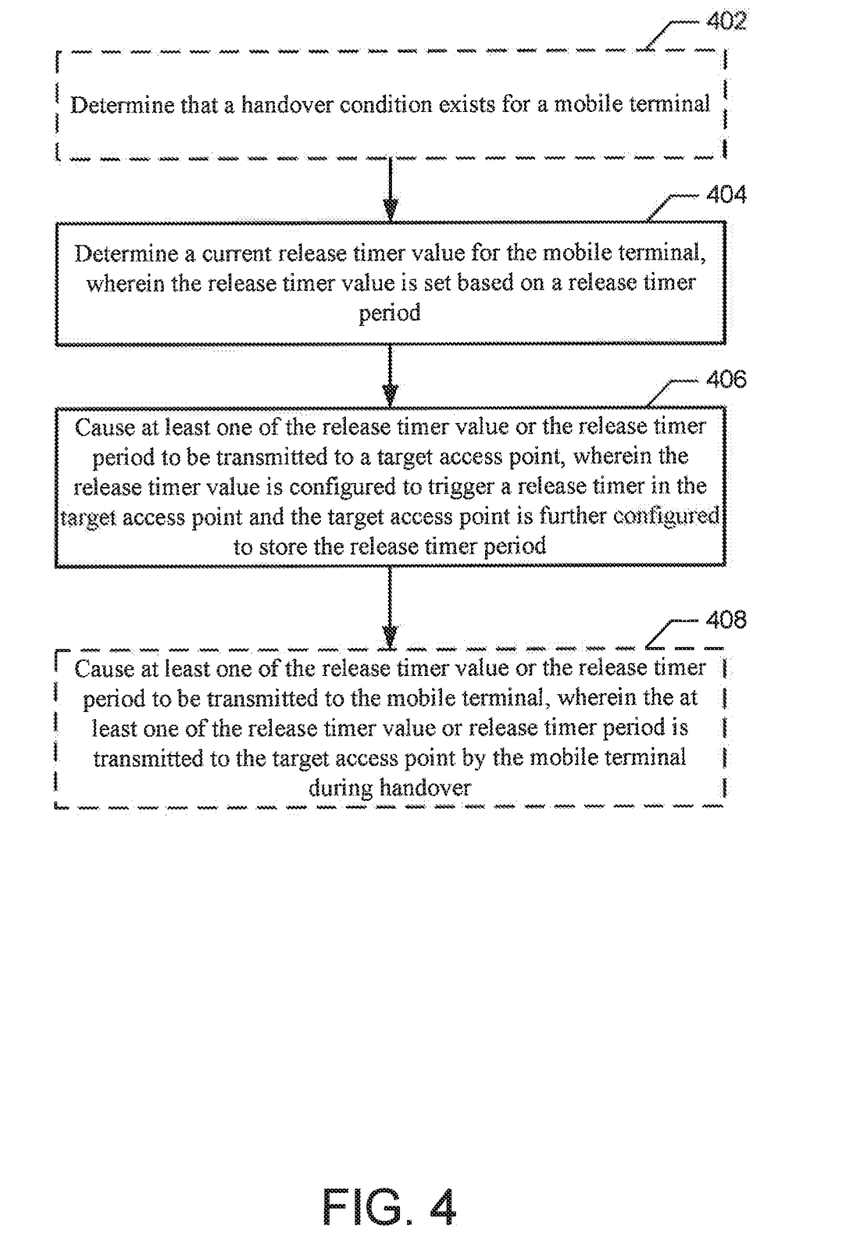
FIG. 4 is a flow chart illustrating operations performed in accordance with some example embodiments of the present invention.
Figure 5:
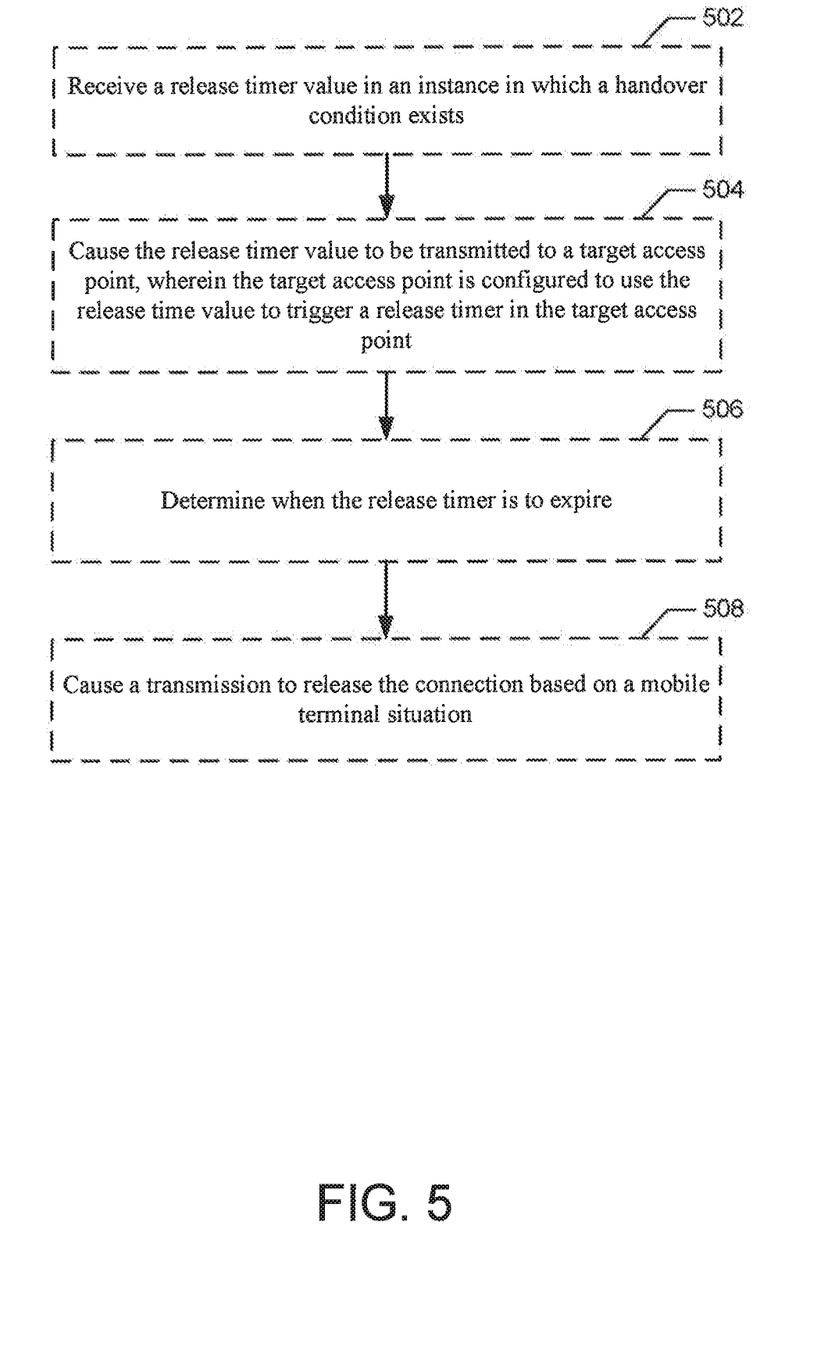
FIG. 5 is a flow chart illustrating operations performed in accordance with some example embodiments of the present invention.

FIGS. 4 and 5 illustrate example flowcharts of the example operations performed by a method, apparatus and computer program product in accordance with some example embodiments of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 112 of an apparatus employing some example embodiments of the present invention and executed by a processor 110 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 4 and 5, when executed, convert a computer or processing circuitry into a particular machine configured to perform an example embodiment of the present invention. Accordingly, the operations of FIGS. 4 and 5 define an algorithm for configuring a computer or processing to perform an example embodiment. In some cases, a general purpose computer may be provided with an instance of the processor which performs the algorithms of FIGS. 4 and 5 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included. It should be appreciated that each of the modifications, optional additions or amplifications below may be included with the operations above either alone or in combination with any others among the features described herein.

FIG. 4 is an example flowchart illustrating optimized state control performed in accordance with some example embodiments of the present invention. As shown in operation 402, the apparatus 300 that is embodied, for example, by the access point 12 may include means, such as the processor 110, the release timer circuitry 118 or the like for determining, based on the mobile terminal measurement reports, that a handover condition exists for a mobile terminal. As shown in operation 404, the apparatus 300 that is embodied, for example, by the access point 12 may include means, such as the processor 110, the release timer circuitry 118 or the like, for determining a current release timer value for the mobile terminal. The access point may adapt the release timer period according the mobile terminal related conditions such as mobile terminal velocity, traffic characteristics or the like. In some example embodiments, the release timer value is set based on a release timer period.

As shown in operation 406, the apparatus 300 that is embodied, for example, by the access point 12 may include means, such as the processor 110, the communications interface 114, the release timer circuitry 118 or the like, for causing at least one of the received release timer value or the release timer period to be transmitted to a target access point. In some example embodiments, the release timer value is configured to trigger a release timer in the target access point and the target access point is further configured to store a received indication of the release timer period. As shown in operation 408, the apparatus 300 that is embodied, for example, by the access point 12 may include means, such as the processor 110, the communications interface 114, the release timer circuitry 118 or the like, for causing at least one of the release timer value or the release timer period to be transmitted to the mobile terminal. In some example embodiments, the at least one of the release timer value or release timer period is transmitted to the target access point by the mobile terminal during handover or doing connection setup to a new cell (after connection failure).

FIG. 5 is an example flowchart illustrating optimized state control in a mobile terminal performed in accordance with some example embodiments of the present invention. As shown in operation 502, the apparatus 300 that is embodied, for example, by the mobile terminal 10 may include means, such as the processor 110, the communications interface 114, the release timer circuitry 118 or the like, for receiving a release timer value and/or release timer period from the access point. As shown in operation 504, the apparatus 300 that is embodied, for example, by the mobile terminal 10 may include means, such as the processor 110, the communications interface 114, the release timer circuitry 118 or the like, for causing the release timer value to be transmitted to a target access point. In some example embodiments the target access point is configured to use the release time value to trigger (e.g. initiate) a release timer.

As shown in operation 506, the apparatus 300 that is embodied, for example, by the mobile terminal 10 may include means, such as the processor 110, the communications interface 114, the release timer circuitry 118 or the like, for determining when the release timer is to expire. As shown in operation 508, the apparatus 300 that is embodied, for example, by the mobile terminal 10 may include means, such as the processor 110, the communications interface 114, the release timer circuitry 118 or the like, for causing a transmission to release the connection or a transmission to request to release the connection by the access network, in some example embodiments, based on a mobile terminal situation such as but not limited to traffic type and characteristics, mobile terminal information, mobile terminal velocity and/or other relevant parameters.

Figure 6:
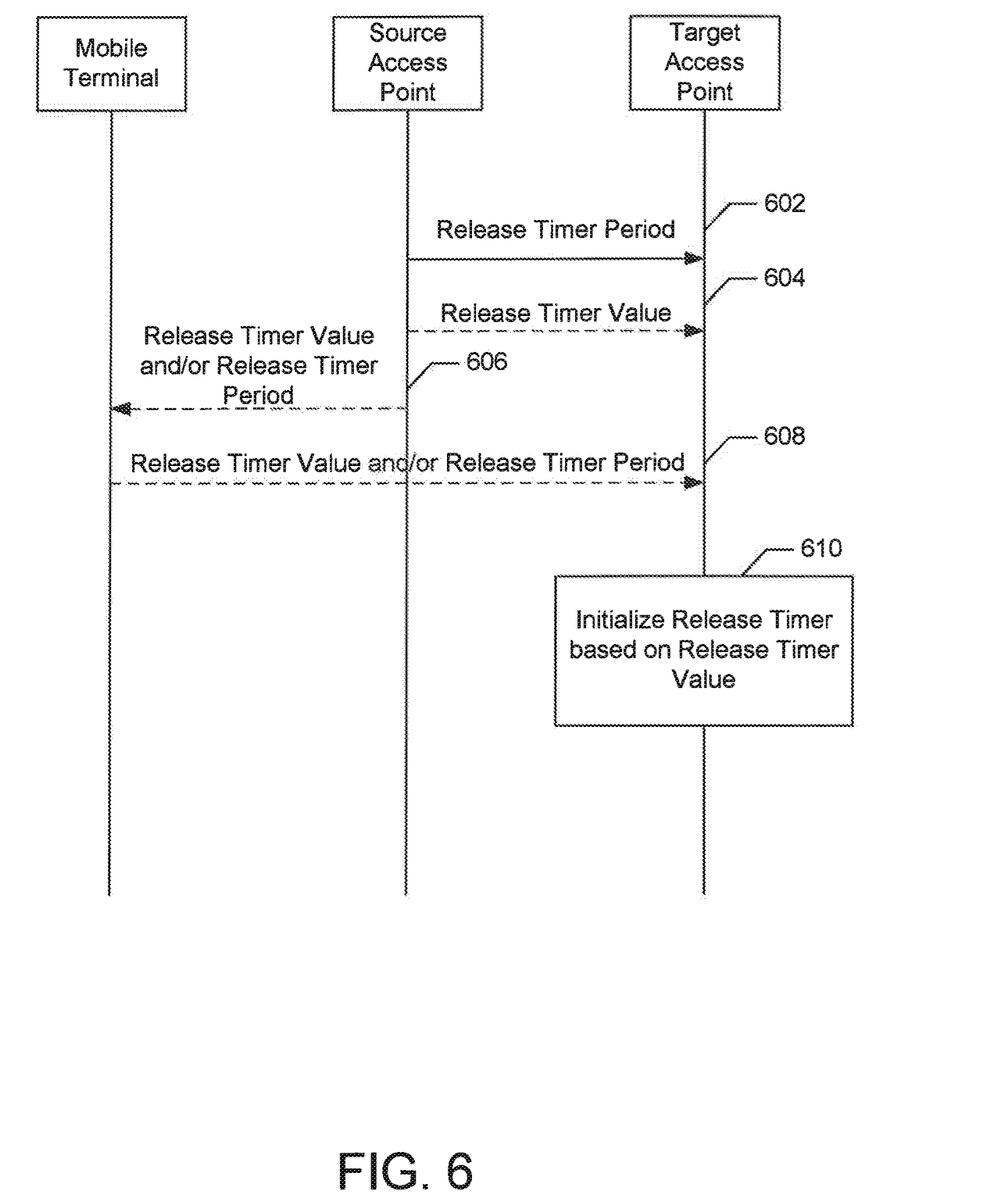
FIG. 6 shows an example signaling flow diagram performed in accordance with some example embodiments of the present invention.

FIG. 6 is an example signal flow diagram illustrating example signaling for optimized state control. In an instance in which a handover is detected, the source access point may cause a release timer period value to be transferred to a target access point at signal 602. In an instance in which the release timer period is a global setting, such a transmission may not be required. The source access point, according to an example embodiment, may the cause a release timer value to be transmitted to a target access point at signal 604. However in alternate embodiments, the source access point may cause the release timer value and/or release timer period to be transmitted to the mobile terminal at signal 606 and then the mobile terminal may cause the release timer value and/or the release timer period to be transmitted at signal 608. In either case, the target access point may initialize a release timer based on the received release timer value and/or period for the mobile terminal at block 610.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising:
   at least one processor; and
   at least one memory including computer program code, the at least one memory and the computer program code configured to, with the at least one processor, cause the apparatus to at least:
   determine that a handover condition exists for a mobile terminal;
   determine a release timer value for the mobile terminal;
   cause the release timer value to be transmitted to a target access point, wherein the release timer value is configured to trigger a release timer in the target access point, wherein the release timer value is based on a release timer period; and
   cause the release timer value and the release timer period to be transmitted to the mobile terminal, wherein the release timer and the release timer period are configured to be transmitted to the target access point by the mobile terminal during handover.

2. An apparatus according to claim 1, wherein the at least one memory including the computer program code is further configured to, with the at least one processor, cause the apparatus to:
   cause a release timer period to be transmitted to the target access point.

3. An apparatus according to claim 2, wherein the target access point is configured to store the release timer period.

4. An apparatus according to claim 2, wherein the release timer period is a global setting.

5. An apparatus according to claim 1, wherein at least one of the release timer value or a release timer period is configured to be transmitted via a handover message in at least one of an X2 interface or an S1 interface.

6. An apparatus comprising:
 at least one processor; and
 at least one memory including computer program code, the at least one memory and the computer program code configured to, with the at least one processor, cause the apparatus to at least:
  determine that a handover condition exists;
  receive a release timer value in an instance in which the handover condition is determined to exist;
  cause the release timer value to be transmitted to a target access point to trigger a release timer, wherein the release timer value is based on a release timer period; and
  cause the release timer value and the release timer period to be transmitted to the mobile terminal, wherein the release timer value and the release timer period are configured to be transmitted to the target access point by the mobile terminal during handover.

7. An apparatus according to claim 6, wherein the at least one memory including the computer program code is further configured to, with the at least one processor, cause the apparatus to:
 determine when the release timer is to expire; and
 cause a transmission to release a connection based on the release timer.

8. An apparatus according to claim 6, further comprising:
 receive a release timer period; and
 cause the release timer period to be transmitted to the target access point.

9. An apparatus according to claim 8, wherein the target access point is configured to store the release timer period.

10. An apparatus according to claim 9, wherein the release timer period is a global setting.

11. An apparatus according to claim 6, wherein at least one of the release timer value or a release timer period is configured to be transmitted via a handover message.

12. An apparatus comprising:
 at least one processor; and
 at least one memory including computer program code, the at least one memory and the computer program code configured to, with the at least one processor, cause the apparatus to at least:
  receive a release timer value in an instance in which a handover condition is determined to exist for a mobile terminal;
  receive a release timer period;
  determine a current release timer value based on the release timer value and the release timer period, wherein the release timer value is based on the release timer period;
  cause the release timer value and the release timer period to be transmitted to the mobile terminal, wherein the release timer value and the release timer period are configured to be transmitted to the target access point by the mobile terminal during handover; and
 cause a release timer to be activated.

13. An apparatus according to claim 12, wherein the release timer period is a global setting.

14. An apparatus according to claim 12, wherein at least one of the release timer value or the release timer period is configured to be transmitted via a handover message in at least one of an X2 interface or an S1 interface.

15. An apparatus according to claim 12, wherein the release timer value and the release timer period are received from the mobile terminal.

16. An apparatus according to claim 12, wherein the release timer value and the release timer period are received from a source access point.

17. An apparatus according to claim 12, wherein the release timer value is received from at least one of the mobile terminal or a source access point and the release timer period is received from at least one of the mobile terminal or the source access point.

* * * * *